US012239165B2

United States Patent
(12) United States Patent
Abi Aoun et al.

(10) Patent No.: US 12,239,165 B2
(45) Date of Patent: Mar. 4, 2025

(54) AEROSOL PROVISION DEVICE

(71) Applicant: NICOVENTURES TRADING LIMITED, London (GB)

(72) Inventors: Walid Abi Aoun, London (GB); Richard John Hepworth, London (GB); Ashley John Sayed, London (GB); Mitchel Thorsen, Madison, WI (US); Luke James Warren, London (GB)

(73) Assignee: NICOVENTURES TRADING LIMITED, London (GB)

(*) Notice: Subject to any disclaimer, the term of this patent is extended or adjusted under 35 U.S.C. 154(b) by 572 days.

(21) Appl. No.: 17/593,147

(22) PCT Filed: Mar. 9, 2020

(86) PCT No.: PCT/EP2020/056233
§ 371 (c)(1),
(2) Date: Sep. 10, 2021

(87) PCT Pub. No.: WO2020/182743
PCT Pub. Date: Sep. 17, 2020

(65) Prior Publication Data
US 2022/0183372 A1 Jun. 16, 2022

Related U.S. Application Data

(60) Provisional application No. 62/816,303, filed on Mar. 11, 2019, provisional application No. 62/816,337, filed on Mar. 11, 2019.

(51) Int. Cl.
*A24F 40/465* (2020.01)
*A24F 40/20* (2020.01)
(Continued)

(52) U.S. Cl.
CPC ............ *A24F 40/465* (2020.01); *A24F 40/20* (2020.01); *A24F 40/51* (2020.01); *H05B 6/108* (2013.01)

(58) Field of Classification Search
CPC .......... A24F 40/20; A24F 40/51; A24F 40/46; A24F 40/70; H05B 6/108; H05B 6/36; A24D 1/20; B29K 2071/00
(Continued)

(56) References Cited

U.S. PATENT DOCUMENTS 5,870,524 A 2/1999 Swiatosz
10,856,575 B2 * 12/2020 Gill ...................... A24F 40/465
(Continued)

FOREIGN PATENT DOCUMENTS

CN 105407750 A 3/2016
CN 208016042 U 10/2018
(Continued)

OTHER PUBLICATIONS

"International Preliminary Report on Patentability received for PCT Patent Application No. PCT/EP2020/0562336, mailed on Sep. 23, 2021", 9 pages.
(Continued)

*Primary Examiner* — Alexander Gilman
(74) *Attorney, Agent, or Firm* — Husch Blackwell

(57) ABSTRACT

A support for a heater component of an aerosol provision device defines an axis and is configured to engage an end of the heater component to hold the heater component substantially parallel to the axis at a predetermined distance from a coil. The support defines a channel to receive a wire of a temperature sensor, and the channel defines an opening into a space between the heater component and the coil. An aerosol provision device is also described which comprises: a heater component configured to heat aerosol generating
(Continued)

material; a first support, wherein the first support defines an axis and is configured to engage a first end of the heater component; a second support, wherein the second support is configured to engage a second end of the heater component; and at least one coil configured to heat the heater component. The first and second supports hold the heater component substantially parallel to the axis at a predetermined distance from the at least one coil.

11 Claims, 11 Drawing Sheets

(51) Int. Cl.
*A24F 40/51* (2020.01)
*H05B 6/10* (2006.01)

(58) Field of Classification Search
USPC .......................................................... 131/329
See application file for complete search history.

(56) References Cited

U.S. PATENT DOCUMENTS

| | | | | |
|---|---|---|---|---|
| 11,240,885 | B2 * | 2/2022 | Fursa | H05B 6/108 |
| 11,324,259 | B2 * | 5/2022 | Courbat | H05B 6/108 |
| 11,363,840 | B2 * | 6/2022 | Courbat | A24F 40/48 |
| 11,375,753 | B2 * | 7/2022 | Fursa | A24F 40/465 |
| 11,433,193 | B2 * | 9/2022 | Rogan | A61M 11/042 |
| 11,452,313 | B2 * | 9/2022 | Kaufman | A24F 40/465 |
| 11,452,826 | B2 * | 9/2022 | Leadley | A61M 15/06 |
| 11,470,883 | B2 * | 10/2022 | Kaufman | H05B 6/365 |
| 11,510,291 | B2 * | 11/2022 | Horrod | A61M 15/06 |
| 2012/0034369 | A1 | 2/2012 | Ito et al. | |
| 2015/0320116 | A1 * | 11/2015 | Bleloch | A61M 11/042 219/628 |
| 2017/0055580 | A1 * | 3/2017 | Blandino | H05B 6/36 |
| 2017/0055583 | A1 * | 3/2017 | Blandino | H05B 6/108 |
| 2017/0079326 | A1 * | 3/2017 | Mironov | H05B 6/108 |
| 2017/0112191 | A1 * | 4/2017 | Sur | A24F 40/50 |
| 2017/0119054 | A1 * | 5/2017 | Zinovik | H05B 6/02 |
| 2017/0156403 | A1 | 6/2017 | Gill et al. | |
| 2017/0196269 | A1 * | 7/2017 | Bernauer | A24F 40/40 |
| 2017/0231276 | A1 * | 8/2017 | Mironov | H05B 1/0244 131/328 |
| 2017/0303586 | A1 * | 10/2017 | Sur | A24F 40/46 |
| 2017/0311648 | A1 | 11/2017 | Gill et al. | |
| 2017/0360102 | A1 * | 12/2017 | Li | A24F 40/465 |
| 2018/0007969 | A1 * | 1/2018 | Sur | A24F 40/50 |
| 2018/0168226 | A1 | 6/2018 | Mironov et al. | |
| 2018/0184713 | A1 * | 7/2018 | Mironov | A24F 40/30 |
| 2018/0192701 | A1 | 7/2018 | Stoner | |
| 2018/0279681 | A1 | 10/2018 | Rojo-Calderon et al. | |
| 2019/0000145 | A1 | 1/2019 | Bleloch et al. | |
| 2019/0090541 | A1 * | 3/2019 | Bernauer | H05B 6/06 |
| 2019/0191783 | A1 * | 6/2019 | Courbat | A24D 1/20 |
| 2019/0200677 | A1 * | 7/2019 | Chong | A24C 5/01 |
| 2020/0022416 | A1 * | 1/2020 | Alarcon | A24F 40/57 |
| 2020/0046020 | A1 * | 2/2020 | Cross | A24F 40/40 |
| 2020/0245682 | A1 * | 8/2020 | Reevell | A24F 40/465 |

FOREIGN PATENT DOCUMENTS

| | | | |
|---|---|---|---|
| CN | 208228311 | U | 12/2018 |
| JP | 2016534730 | A | 11/2016 |
| JP | 2017526381 | A | 9/2017 |
| RU | 2517125 | C2 | 5/2014 |
| WO | 2014139611 | A1 | 9/2014 |
| WO | 2016075436 | A1 | 5/2016 |
| WO | 2017137512 | A1 | 8/2017 |
| WO | 2018073376 | A1 | 4/2018 |
| WO | 2019030167 | A1 | 2/2019 |

OTHER PUBLICATIONS

"International Search Report and Written Opinion received for PCT Patent Application No. PCT/EP2020/056233, mailed on May 26, 2020", 12 pages.
"Office Action received for Russian Patent Application No. 2021126531, mailed on Jul. 5, 2022", 11 pages.
"Reason for Refusal received for Japanese Patent Application No. 2021-554586, mailed on Nov. 22, 2022", 10 pages.

* cited by examiner

AEROSOL PROVISION DEVICE

PRIORITY CLAIM

The present application is a National Phase entry of PCT Application No. PCT/EP2020/056233, filed Mar. 9, 2020, which claims priority from U.S. Provisional Application No. 62/816,303, filed Mar. 11, 2019, and which claims priority from U.S. Provisional Application No. 62/816,337, filed Mar. 11, 2019, each of which is hereby fully incorporated herein by reference.

TECHNICAL FIELD

The present invention relates to a support for a heater component of an aerosol provision device and an aerosol provision device including the support. The present invention also relates to an aerosol provision device, an aerosol provision system and an article comprising aerosol generating material.

BACKGROUND

Smoking articles such as cigarettes, cigars and the like burn tobacco during use to create tobacco smoke. Attempts have been made to provide alternatives to these articles that burn tobacco by creating products that release compounds without burning. Examples of such products are heating devices which release compounds by heating, but not burning, the material. The material may be for example tobacco or other non-tobacco products, which may or may not contain nicotine.

SUMMARY

According to a first aspect of the present disclosure, there is provided a support for a heater component of an aerosol provision device, wherein the support defines an axis and is configured to engage an end of the heater component to hold the heater component substantially parallel to the axis at a predetermined distance from a coil, and wherein the support defines a channel to receive a wire of a temperature sensor, the channel defining an opening into a space between the heater component and the coil.

According to a second aspect of the present disclosure, there is provided an aerosol provision device. The aerosol provision device includes a support according to the first aspect; a heater component engaged with the support at one end; a coil extending around the heater component, wherein the coil is configured to heat the heater component; a temperature sensor for sensing the temperature of the heater component, wherein the temperature sensor is positioned in a space between the coil and the heater component; and a wire positioned in the channel of the support and connected to the temperature sensor.

According to a third aspect of the present disclosure, there is provided an aerosol provision device. The device includes a support defining an axis; a coil; and a heater component. The heater component is heatable by the coil; an end of the heater component is engaged with the support to hold the heater component substantially parallel to the axis at a predetermined distance from the coil; and the support defines a channel which defines an opening into a space between the heater component and the coil. Additionally, the device includes a temperature sensor for sensing the temperature of the heater component, wherein the temperature sensor is positioned in the space between the heater component and the coil; and a wire positioned in the channel of the support and connected to the temperature sensor.

According to a fourth aspect of the present disclosure, there is provided an aerosol provision device. The device includes a heater component configured to heat aerosol generating material; a first support, wherein the first support defines an axis and is configured to engage a first end of the heater component; a second support, wherein the second support is configured to engage a second end of the heater component; and at least one coil configured to heat the heater component, wherein the first and second supports hold the heater component substantially parallel to the axis at a predetermined distance from the at least one coil.

According to a fifth aspect of the present disclosure, there is provided an aerosol provision device. The device includes a heater component configured to heat aerosol generating material; a support, wherein the support defines an axis and is configured to engage a first end of the heater component; and at least one coil configured to heat the heater component, wherein the support holds the heater component substantially parallel to the axis at a predetermined distance from the at least one coil.

Further features and advantages of the invention will become apparent from the following description of preferred embodiments of the invention, given by way of example only, which is made with reference to the accompanying drawings.

DETAILED DESCRIPTION OF THE DRAWINGS

Figure 1:
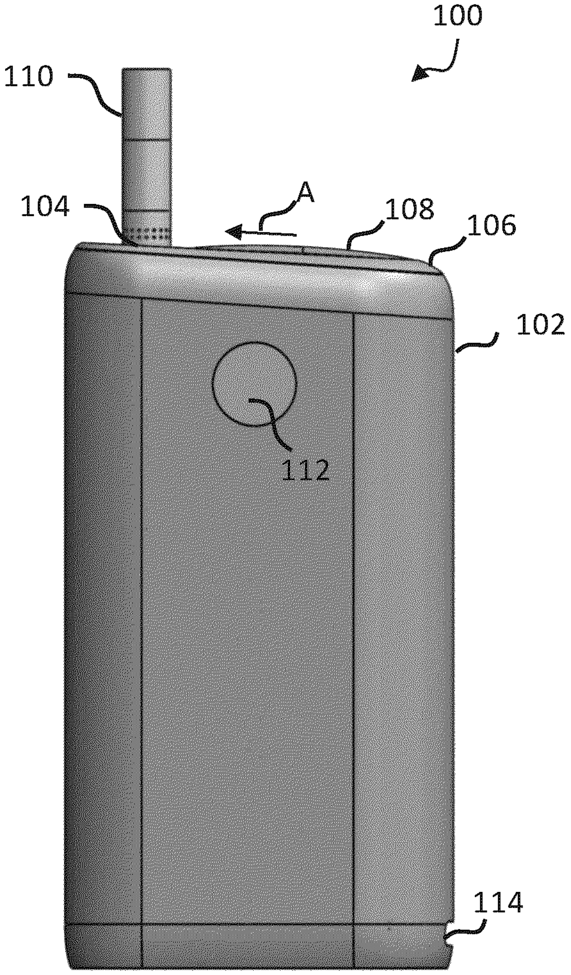
FIG. 1 shows a front view of an example of an aerosol provision device.

As used herein, the term "aerosol generating material" includes materials that provide volatilized components upon heating, typically in the form of an aerosol. Aerosol generating material includes any tobacco-containing material and may, for example, include one or more of tobacco, tobacco derivatives, expanded tobacco, reconstituted tobacco or tobacco substitutes. Aerosol generating material also may include other, non-tobacco, products, which, depending on the product, may or may not contain nicotine. Aerosol generating material may for example be in the form of a solid, a liquid, a gel, a wax or the like. Aerosol generating material may for example also be a combination or a blend of materials. Aerosol generating material may also be known as "smokable material."

Apparatuses are known that heat aerosol generating material to volatilize at least one component of the aerosol generating material, typically to form an aerosol which can be inhaled, without burning or combusting the aerosol generating material. Such an apparatus is sometimes described as an "aerosol generating device," an "aerosol provision device," a "heat-not-burn device," a "tobacco heating product device," or a "tobacco heating device" or similar. Similarly, there are also so-called e-cigarette devices, which typically vaporize an aerosol generating material in the form of a liquid, which may or may not contain nicotine. The aerosol generating material may be in the form of or be provided as part of a rod, cartridge or cassette or the like which can be inserted into the apparatus. A heater for heating and volatilizing the aerosol generating material may be provided as a "permanent" part of the apparatus.

An aerosol provision device can receive an article comprising aerosol generating material for heating. An "article" in this context is a component that includes or contains in use the aerosol generating material, which is heated to volatilize the aerosol generating material, and optionally other components in use. A user may insert the article into the aerosol provision device before it is heated to produce an aerosol, which the user subsequently inhales. The article may be, for example, of a predetermined or specific size that is configured to be placed within a heating chamber of the device which is sized to receive the article.

A first aspect of the present disclosure defines a support for a heater component (such as a susceptor) of an aerosol provision device. As will be discussed in more detail herein, a susceptor is an electrically conducting object, which is heated via electromagnetic induction. An article comprising aerosol generating material can be received within the heater component. Once heated, the heater component transfers heat to the aerosol generating material, which releases the aerosol. In some cases, the device can monitor the temperature of the heater component in one or more locations, as it is being heated. This may be useful because the aerosol generating material may need to be heated to a specific temperature. For example, if the temperature of the heater component is too high, the aerosol generating material may overheat, which can impact the taste/flavor of the aerosol. If the temperature of the heater component is too low, the volume of aerosol generated may be too low. Accordingly, it may be useful to control and monitor the temperature of the heater component during heating.

To monitor the temperature of the heater component, one or more temperature sensors may be in contact with, or positioned near, the heater component. The temperature sensor may be a thermocouple, for example. One or more wires may connect the temperature sensor to other electronic circuitry within the aerosol provision device, and the wires must therefore be routed from the heater component, to another location within the device.

As mentioned, the heater component may be a susceptor, and the heater component may be heated by a coil (such as an inductor coil). An inductor coil is configured to generate a varying magnetic field. A susceptor is heatable by penetration with the varying magnetic field.

In an example aerosol provision device, the heater component may be surrounded by one or more components, such as an insulating member which can be arranged coaxially with the heater component. The insulating member can help insulate other components of the device from the heat generated by the heater component. The insulating member may also support one or more coils which are positioned around, and spaced apart from, the heater component.

In some conventional aerosol provision devices, the wires from the temperature sensors are routed through a surface of the insulating member. For example, one or more through holes may be formed through the insulating member, and the wires passed through the through hole. However, it has been found that the through hole can weaken the structural integrity of the insulating member. Thus, the insulating member is more prone to damage. In addition, depending upon the size and location of the through hole, the hole can also reduce the insulative effect provided by the insulating member. Thus, heat can escape from the space between the heater component and the insulating member.

The present invention relates to a support which defines a channel through which the wire of a temperature sensor can pass. The support is an element which holds the heater component in place within the device. The channel formed in the support defines an opening into a space between the heater component and coil/insulating member. This means that the wire does not need to be routed through the insulating member so that its structural integrity is not compromised. One or more wires may be routed through the channel.

The support, also known as a "cleanout tube," defines an axis and is configured to engage an end of the heater component to hold the heater component substantially parallel to the axis at a predetermined distance from a coil. The support therefore holds the heater component in place within the device, relative to the coil. The wire can therefore be routed along the heater component (generally in the direction of the axis), and through the channel so that it can extend out of the space between the heater component and the coil.

The channel may extend substantially parallel to the axis. In other words, the channel is formed through a portion of the support in a direction that is substantially parallel to the axis. The wire, once received in the channel, therefore extends in a direction substantially parallel to the axis. This construction can be easier to manufacture, and also minimizes length of wire used because it defines the shortest route into the space between the heater component and the coil/insulating member. In other examples the channel may not be parallel to the axis.

The channel may be open along its length. In other words, the channel may be open around its perimeter. In contrast, a channel that is closed around its perimeter would be a through hole formed through a portion of the support. A channel which is open along its length can be easily manufactured and may allow the device to be assembled quicker. For example, the wire can be slotted into the channel, rather than requiring the wire to be threaded through a hole.

The channel can have a depth which is measured in a direction perpendicular to the axis. The channel may therefore define a notch formed in a portion of the support. The channel may have a depth of less than about 5 mm, or less than about 3 mm. Preferably, the channel has a depth of less than about 2 mm, such as about 1.7 mm. If the channel is too deep, then heat may more easily escape from the space between the heater component and coil. If the channel is too shallow, then the wire may need to be angled with respect to the axis and heater component, which may bend or break the wire. The above dimensions provide a good balance between these considerations.

The channel can have a width which is measured in a direction perpendicular to the axis and the depth. The channel may have a width of less than about 2 mm, or less than about 1 mm. Preferably, the channel has a width of about 0.9 mm. If the channel is too wide, then heat may more easily escape from the space between the heater component and coil.

The support may comprise a first portion, and the channel may be formed through the first portion. The first portion may have a first cross section, and may be arranged generally perpendicular to the axis. The first portion may be substantially circular in cross section, although other cross-sectional shapes are possible. The first portion may have a perimeter which extends around the axis. The first portion may have a first depth, measured in a direction parallel to the axis. The channel therefore has a length equal to the first depth if the channel is formed parallel to the axis, or has a length greater than the first depth if the channel is not parallel to the axis.

In some examples, the channel is a notch at an outer perimeter of the first portion. In other examples however, the channel is closed around its perimeter such that a through hole is formed through the first portion. The inner diameter of the though hole can be substantially the same as the outer diameter of the wire, which thereby reduces heat loss from the heater component.

The insulating member may surround the heater component and abut at least part of the first portion of the support, such that the insulating member is positioned at a predetermined radial distance outward/away from the heater component. The first portion may therefore be arranged inside the insulating member. The first portion can therefore act as "plug" to at least partially seal/enclose the space between the insulating member and the heater component. The first portion can therefore reduce heat loss.

The support may comprise a second portion spaced apart from the first portion in a direction parallel to the axis, and a second channel may be formed through the second portion to receive the wire. The "channel" formed in the first portion may therefore be known as a "first channel". The second portion may have substantially the same shape and/or dimensions as the first portion. The wire therefore passes through the first channel formed in the first portion, and passes through the second channel formed in the second portion. The second portion provides a second "barrier" to help enclose/seal/insulate the space between the heater component and the induction coil/insulating member.

In some examples the second portion may not comprise a channel. Instead, the wire may be routed around the second portion.

The support (or aerosol provision device) may further comprise a resilient member arranged between the first and second portions. The resilient member can therefore be retained in position along the axis by the first and second portions. In other words, the resilient member cannot move along the axis beyond the first and second portions. The resilient member may be an O-ring, for example. The resilient member therefore surrounds the support and helps enclose/seal/insulate the space between the heater component and induction coil/insulating member. In examples where the insulating member is present, the resilient member may abut the inner surface of the insulating member.

In some examples, the resilient member encloses/encircles the wire. In other words, the resilient member extends around the wire. Thus, in examples where the resilient member is an O-ring, the wire passes inside the "O." This arrangement can help keep the wires taught so that they are less likely to be damaged, and/or can hold the wires in the channel. Holding the wires in the channel can help stop the temperature sensor from being pulled away from the surface of the heater component.

In another example, the wire passes through an aperture/hole formed in the resilient member. This arrangement means that the resilient member (such as an O-ring) can function better to create a seal. For example, the inner surface of the O-ring can better conform to the support without the wire running between the O-ring and support. The resilient member may be an O-ring, and the wire extends through an aperture formed in the O-ring such that the (total) outer circumference of wire abuts the O-ring.

In some examples, the second portion may be omitted. In such an example, the resilient member be longitudinally spaced from the channel. In other words, the second portion is not necessarily needed to hold the resilient member in place. The O-ring may be held in place by friction; for example, the O-ring may grip the support as it encircles the support.

The support may comprise an end portion, where the end portion is configured to abut an end of an insulating member which surrounds the heater component. The end portion therefore holds the insulating member in place, and may help enclose/seal the space between the heater component and induction coil/insulating member.

The support may comprise at least two channels (each formed in the first portion). Each channel may receive a single wire. In other examples, two or more wires may be introduced into the, or each, channel. In a specific example there are four channels, each channel configured to receive a single wire. In one example, the device comprises two temperature sensors, each temperature sensor comprising two wires, and each wire is received in a separate channel.

Having a separate channel for each wire helps electrically insulate each wire from adjacent wires. A separate channel for each wire can also reduce heat loss from the heater component.

As mentioned, the second aspect of the present disclosure defines an aerosol provision device comprising a support as described above. The device further comprises a heater component engaged with the support at one end, and a coil extending around the heater component, where the coil is configured to heat the heater component (via a magnetic field, for example). The device further comprises a temperature sensor for sensing the temperature of the heater component, where the temperature sensor is positioned in a space between the coil and the heater component. The device further comprises a wire positioned in the channel of the support and connected to the temperature sensor.

The device may define a longitudinal axis that is substantially parallel to the axis of the support. The device may define a proximal end, and a distal end. In use, the proximal end of the device may be held closer to a user's mouth than the distal end. In use, aerosol may be drawn towards the proximal end of the device. In an example, the support engages the distal end of the heater component.

The device may further comprise an insulating member. The support may comprise a first portion, where the channel is formed through the first portion. The insulating member may surround the heater component and abut at least part of the first portion of the support, thereby to position the insulating member at a predetermined radial distance outward from the heater component. Thus, the insulating member surrounds the first portion of the support. In other words, the insulating member is arranged between the heater component and the coil, and is spaced apart from the axis by a first distance. A perimeter of the first portion is spaced apart from the axis by a second distance. The first distance may be substantially equal to the second distance. Thus, the first distance may be slightly greater than the second distance, so that the first portion may fit inside the hollow insulating member. The perimeter of the first portion may abut the inner surface of the insulating member. In examples where a resilient member is present, the outer edge of the resilient member may be spaced apart from the axis by a third distance, the third distance being substantially equal to the first distance. Thus, the resilient member may abut the inner surface of the insulating member.

In some examples, the device comprises a first coil and a second coil. The first coil may be used to heat a first portion of the heater component, and the second coil may be used to heat a second portion of the heater component. In an example, the device comprises a first temperature sensor arranged to sense a temperature of the first portion of the heater component, and a second temperature sensor arranged to sense a temperature of the second portion of the heater component. Each temperature sensor may be associated with two wires, and the support may define four channels, where each channel receives a wire.

Accordingly, the device may comprise a second temperature sensor for sensing the temperature of the heater component, wherein the second temperature sensor is positioned in the space between the coil and the heater component and a second wire is connected to the second temperature sensor, wherein the support defines a second channel to receive the second wire.

In some examples the temperature sensor is in contact with the heater component. This allows for a more accurate reading of the heater component temperature.

A fourth aspect of the present disclosure relates to the positioning of a heater component in relation to first and second supports. The first and second supports engage opposite ends of the heater component and hold the heater component in place within the aerosol provision device. One or more coils are positioned away from the heater component by a predetermined distance. In some arrangements, the one or more coils extend around the heater component. The heater component may be known as a susceptor, in some examples.

The first and second supports (also known as heater component mounts, or susceptor mounts) ensure that the heater component is adequately positioned in relation to the one or more coils. By keeping the distance between the heater component and coil constant over time, the heater component can be heated effectively each time the device is used. Furthermore, because the first and second supports are not integral with the heater component, heat is transferred to the first and second supports at a slower rate. This can help insulate other components of the device from the heated heater component. In other examples, however, the first and second supports are integral with the heater component. For example, they may be molded together. While this may increase the rate at which heat conducts away from the heater component, it can more robustly hold the heater component in place.

The first and second supports may be thermally insulating. As mentioned above, this reduces the rate of heat flow through the first and second supports, to other components of the device. In one particular example, the first and second supports have thermal conductivity of less than about 0.5 W/mK. It has been found that when the first and second supports have thermal conductivities below this value, an adequate insulating effect can be achieved. The first and second supports may have the same, or different thermal conductivities. In a further example, the first and second supports have a thermal conductivity of less than about 0.35 W/mK, such as about 0.32 W/mK.

The first and second supports may comprise a plastics material. For example, they may be entirely, or partially made from one or more plastics materials. Preferably the portion of the support which engages the heater component comprises the plastics material. Plastics are good thermal insulators, are relatively inexpensive, are lightweight, and can easily be molded into the required shape to engage the heater component. In one example the plastics material comprises polyether ether ketone (PEEK). PEEK is a particularly suitable material for the first and second supports because it has a thermal conductivity of about 0.32 W/mK, a melting point of about 343° C. and is not electrically conductive, so will not generate heat as a result of the coils. In one example, the PEEK is VICTREX® PEEK 450G.

In some examples, the first and second supports have a melting point of greater than about 300° C. Preferably, the first and second supports have a melting point of greater than about 340° C. In some examples, in use, the one or more coils are configured to heat the heater component to a temperature of between about 240° C. and about 280° C. Thus, by having first and second supports with a melting point temperature that is above the temperature of the heated heater component, the first and second supports are less likely to soften and lose their structural integrity due to melting.

In use, the at least one coil may be configured to heat the heater component to a first temperature and the first and second supports have a melting point of a second temperature, wherein the second temperature is greater than the first temperature by at least about 60° C. This ensures that the first and second supports remain structurally stable, and do not begin to weaken as the temperature of heater component increases. For example, in some arrangements, the first temperature is 250° C. and the second temperature is 343° C. In another example, the first temperature is 280° C. and the second temperature is 343° C. In some devices the coils may operate in two modes. In a first mode the heater is heated to a lower temperature than in a second mode.

In some examples, the aerosol provision device further comprises an insulating member extending around the heater component, wherein the insulating member is positioned away from the heater component to provide an air gap around the heater component. The insulating member may be positioned between the at least one coil and the heater component such that the at least one coil extends around the insulating member. In certain arrangements the coil may be in contact with the insulating member. However, in other examples a further air gap may be provided between the insulating member and the coil. Such an arrangement provides a device with improved insulation. The specific order of the air gap and the insulating member provides improved insulation from the heated heater component. The air gap helps insulate the insulating member from the heat. In addition, the first and second supports, the air gap and the insulating member help insulate other components of the device from the heat. For example, the supports, air gap and insulating member reduce any heating of the coil, electronics, and/or battery by the heater component.

As mentioned above, the insulating member is positioned away from the receptacle/heater component to provide an air gap. For example, the inner surface of the insulating member is spaced apart from the outer surface of the heater component. This means that an air gap surrounds the outer surface of the heater component, and the heater component is not in contact with the insulating member in this region. Any contact could provide a thermal bridge along which heat could flow.

In a particular arrangement the heater component is elongate and defines an axis, such as a longitudinal axis. The insulating member extends around the heater component and the axis in an azimuthal direction. The insulating member is therefore positioned radially outward from the heater component, for example the insulating member may be coaxial with the heater component. This radial direction is defined as being perpendicular to the axis of the heater component. Similarly, the coil extends around the insulating member and is positioned radially outwards from both the heater component and the insulating member. The coil may be coaxial with the insulating member and the heater component.

The insulating member is thermally insulating. For example, it may comprise a plastics material and may have low thermal conductivity such as a thermal conductivity of less than about 0.5 W/mK. In one example the plastics material is PEEK, and may therefore be made from the same material as the first and second supports.

The insulating member may abut at least one of the first support and the second support such that the insulating member is held substantially parallel to the axis. For example, the insulating member may extend between the first and second supports such that a first end of the insulating member abuts the first support and a second end of the insulating member abuts the second support. The first and second supports may therefore also support the insulating member as well as the heater component, which reduces the number of components in the device.

The first support may comprise a first resilient member and the resilient member may abut an inner surface of the insulating member. The insulating member may therefore extend around a portion of the first support which comprises the first resilient member. The resilient member may be an O-ring, for example. The resilient member may extend around an outer surface of the first support. When the resilient member abuts the inner surface of the insulating member it can help seal the space between the heater component and insulating member to better insulate the heater component from other components of the device. In some examples the resilient member may not abut the inner surface of the insulating member, but may nevertheless provide improved insulation when compared to an arrangement without a resilient member.

The first support may comprise a first portion and a second portion spaced apart from the first portion in a direction parallel to the axis, and wherein the resilient member is arranged between the first and second portions. The resilient member can therefore be retained in position along the axis by the first and second portions. In other words, the resilient member cannot move along the axis beyond the first and second portions.

The second support may comprise a second resilient member and the second resilient member may abut the inner surface of the insulating member, such that the first and second resilient members seal the air gap. The insulating member may therefore extend around a portion of the second support which comprises the second resilient member. The second resilient member may be an O-ring, for example. The second resilient member may extend around an outer surface of the second support. When the second resilient member abuts the inner surface of the insulating member it can help seal the space between the heater component and insulating member to better insulate the heater component from other components of the device. In some examples the second resilient member may not abut the inner surface of the insulating member, but may nevertheless provide improved insulation when compared to an arrangement without a second resilient member.

In some examples, the second support comprises a recess within which the second resilient member is received/located. By having a recess, rather than first and second portions like the first support, the main body of the second support can be made wider, thereby allowing the second support to function as an expansion chamber. A wider expansion chamber allows the hot aerosol to expand in volume, and thereby cool to a more comfortable temperature. For at least the same purpose, in some examples the second resilient member may have a width that is smaller than a width of the first resilient member.

Alternatively, the second support may comprise a third portion and a fourth portion spaced apart from the third portion in a direction parallel to the axis, and wherein the second resilient member is arranged between the third and fourth portions.

The resilient members may comprise silicone, such as silicone rubber. Silicone rubber is heat resistant and has good mechanical properties which remain unchanged in a wide range of temperatures. Silicone rubber is also safe for use in aerosol provision devices. In one example, the silicone rubber is ELASTOSIL™ from Wacker Chemie AG.

The resilient members may be thermally insulating. For example, they may have a thermal conductivity of less than about 0.5 W/mK. This slows the transfer of heat between the supports and other components of the device.

The first and second resilient members may have a first thermal conductivity and the first and second supports may have a second thermal conductivity, and wherein the first thermal conductivity is less than the second thermal conductivity. Thus, each of the first and second resilient members may have a thermal conductivity that is less than the thermal conductivities of the first and second supports. This specific arrangement reduces the rate at which heat flows from the heater component, through the first and second supports, and through the first and second resilient members to the insulating member. This helps insulate the insulating member. In a particular example the first thermal conductivity is less than about 0.3 W/mK and the second thermal conductivity is less than about 0.5 W/mK. For example, silicone rubber can have a thermal conductivity of between about 0.2 W/mK and about 0.25 W/mK and PEEK can have a thermal conductivity of about 0.32 W/mK. Although the first and second resilient members may have a thermal conductivity that is less than the thermal conductivity of the first and second supports, they may each have different thermal conductivities. Similarly, the first and second supports may each have different thermal conductivities.

It is desirable to reduce the surface area of the insulating member that is in contact with the first and second resilient members to reduce/slow the flow of heat. Similarly, it is desirable to reduce the surface area of the heater component that is in contact with the first and second supports to reduce/slow the flow of heat. In one example, less than 5% of the surface area of the heater component is in contact with each support. Preferably, less than 3% of the surface area of the heater component is in contact with each support. More preferably, less than 2% of the surface area of the heater component is in contact with each support. In some examples, more than 1% of the surface area of the heater component is in contact with each support. This can provide sufficient engagement to hold the heater component in place.

In some examples, instead of having either or both of the resilient members, the insulating member can be molded to the first and/or second supports to help seal the space between the heater component and the insulating member. While this may increase the flow of heat, it can provide a better seal.

The first support may comprise an engagement region comprising two or more protrusions which extend along the heater component in a direction parallel to the axis. Each of the protrusions may be spaced apart around the outer surface of the heater component and be separated by a gap. The protrusions allow the first support to flex outwards as the heater component is inserted into, and engages with, the engagement region. This makes it easier for the device to be assembled, and reduces the likelihood of damaging the heater component.

The second support may also comprise a second engagement region comprising two or more protrusions which extend along the heater component in a direction parallel to the axis.

Preferably the engagement region(s) comprise three or four protrusions to provide greater support.

In some examples, the heater component comprises an inductively heatable portion and a non-inductively heated portion. The inductively heatable portion heats the article. One or more non-inductively heated portions can connect the heater component to the device, and so preferably are good heat insulators. The non-inductively heated portion can also provide rigidity for receiving an article. The one or more non-inductively heated portions may be arranged at ends of the heater component.

In a specific example, the heater component comprises an inductively heatable portion and a first non-inductively heated portion arranged at a first end of the heater component, and a second non-inductively heated portion arranged at a second end of the heater component. The first support can engage the first non-inductively heated portion and the second support can engage the second non-inductively heated portion. By engaging non-inductively heated portions, the heater component can be better supported and the first and second supports can be better insulated from the inductively heatable portion.

In another aspect, there is provided a first support for supporting a heater component of an aerosol provision device, wherein the first support defines an axis and is configured to engage a first end of the heater component to hold the heater component substantially parallel to the axis at a predetermined distance from at least one coil. The first support may have any or all of the features described above in relation to the aerosol provision device.

In another aspect, there is provided a second support for supporting a heater component of an aerosol provision device, wherein the second support is configured to engage a second end of the heater component to hold the heater component substantially parallel to an axis at a predetermined distance from at least one coil. The second support may have any or all of the features described above in relation to the aerosol provision device.

In some examples, the device may only comprise one of the first and second supports. For example, in one aspect, there is provided an aerosol provision device, comprising a heater component configured to heat aerosol generating material, a support, wherein the support defines an axis and is configured to engage a first end of the heater component, and at least one coil configured to heat the heater component. The support holds the heater component substantially parallel to the axis at a predetermined distance from the at least one coil. In such an example, less than 5% of the surface area of the heater component may be in contact with the support. Preferably, less than 3% of the surface area of the heater component is in contact with the support. More preferably, less than 2% of the surface area of the heater component is in contact with the support. In some examples, more than 1% of the surface area of the heater component is in contact with the support. This can provide sufficient engagement to hold the heater component in place.

The heater component may be hollow and/or substantially tubular to allow the aerosol generating material to be received within the heater component, such that the heater component surrounds the aerosol generating material. The insulating member may be hollow and/or substantially tubular so that the heater component can be positioned within the insulating member.

The coil may be substantially helical. For example, the coil may be formed from wire, such as Litz wire, which is wound helically around the insulating member. In another example, the coil may not extend around the heater component, but instead may be arranged differently but nevertheless heat the heater component.

The coil may be positioned away from an outer surface of the heater component by a distance of between about 3 mm and about 4 mm. Accordingly, the inner surface of the coil and the outer surface of the heater component may be spaced apart by this distance. The distance may be a radial distance. It has been found that distances within this range represent a good balance between the heater component being radially close to the coil to allow efficient heating of the heater component and being radially distant for improved insulation of the coil (and insulating member, if present).

In another example, the coil may be positioned away from the outer surface of the heater component by a distance of greater than about 2.5 mm.

In another example, the coil may be positioned away from an outer surface of the heater component by a distance of between about 3 mm and about 3.5 mm. In a further example, the coil may be positioned away from an outer surface of the heater component by a distance of between about 3 mm and about 3.25 mm, for example preferably by about 3.25 mm. In another example, the coil may be positioned away from an outer surface of the heater component by a distance greater than about 3.2 mm. In a further example the coil may be positioned away from an outer surface of the heater component by a distance of less than about 3.5 mm, or by less than about 3.3 mm. It has been found that these distances provide a balance between the heater component being radially close to the coil to allow efficient heating and being radially distant for improved insulation of the coil and insulating member.

Reference to an "outer surface" of an entity means the surface positioned furthest away from the axis of the heater component, in a direction perpendicular to the axis. Similarly, reference to an "inner surface" of an entity means the surface positioned closest to the axis of the heater component, in a direction perpendicular to the axis.

The insulating member may have a thickness of between about 0.25 mm and about 1 mm. For example, the insulating member may have a thickness of less than about 0.7 mm, or less than about 0.6 mm, or may have a thickness of between about 0.25 mm and about 0.75 mm, or preferably has a thickness of between about 0.4 mm and about 0.6 mm, such as about 0.5 mm. It has been found that these thicknesses represent a good balance between reducing heating of the insulating member and coil (by making the insulating member thinner to increase the air gap size), and increasing the robustness of the insulating member (by making it thicker).

The heater component may have a thickness between about 0.025 mm and about 0.5 mm, or between about 0.025 mm and about 0.25 mm, or between about 0.03 mm and about 0.1 mm, or between about 0.04 mm and about 0.06 mm. For example, the heater component may have a thickness of greater than about 0.025 mm, or greater than about 0.03 mm, or greater than about 0.04 mm, or less than about 0.5 mm, or less than about 0.25 mm, or less than about 0.1 mm, or less than about 0.06 mm. It has been found that these thicknesses provide a good balance between fast heating of the heater component (as it is made thinner), and ensuring that the heater component is robust (as it is made thicker).

In an example, the heater component has a thickness of about 0.05 mm. This provides a balance between fast and effective heating, and robustness. Such a heater component may be easier to manufacture and assemble as part of an aerosol provision device than other heater components with thinner dimensions.

Reference to the "thickness" of an entity means the average distance between the inner surface of the entity and the outer surface of the entity. Thickness may be measured in a direction perpendicular to the axis of the heater component.

In a particular arrangement of the aerosol provision device, the coil is positioned away from an outer surface of the heater component by a distance of between about 3 mm and about 4 mm, the insulating member has a thickness of between about 0.25 mm and about 1 mm, and the heater component has a thickness of between about 0.025 mm and about 0.5 mm. Such an aerosol provision device allows quick heating of the heater component and effective insulative properties.

In another particular arrangement, the coil may be positioned away from an outer surface of the heater component by a distance of between about 3 mm and about 3.5 mm, the insulating member has a thickness of between about 0.25 mm and about 0.75 mm, and the heater component has a thickness of between about 0.04 mm and about 0.06 mm. Such an aerosol provision device allows improved heating of the heater component and improved insulative properties.

In a further particular arrangement, the coil is positioned away from an outer surface of the heater component by a distance of about 3.25 mm, the insulating member has a thickness of about 0.5 mm, and the heater component has a thickness of about 0.05 mm. Such an aerosol provision device allows efficient heating of the heater component and good insulative properties.

The coil, the heater component and the insulating member may be coaxial. This arrangement ensures that the heater component is heated effectively, and ensures that the air gap and insulating member provide effective insulation.

The inner surface of the coil may be in contact with an outer surface of the insulating member. Thus, the insulating member can support the coil without the need for other components. In other examples however there may be a further air gap present between the inner surface of the coil and the outer surface of the insulating member. The distance between the inner surface of the coil and the outer surface of the insulating member may be less than about 0.1 mm, for example it may be about 0.05 mm.

The insulating member may have a melting point of greater than about 280° C., such as greater than about 300° C., or greater than about 340° C. PEEK has a melting point of 343° C. Insulating members with such melting points ensure that the insulating member remains rigid/solid when the heater component is heated.

Preferably, the device is a tobacco heating device, also known as a heat-not-burn device.

As briefly mentioned above, in some examples, the coil(s) is/are configured to, in use, cause heating of at least one electrically-conductive heating component/element (also known as a heater component/element), so that heat energy is conductible from the at least one electrically-conductive heating component to aerosol generating material to thereby cause heating of the aerosol generating material.

In some examples, the coil(s) is/are configured to generate, in use, a varying magnetic field for penetrating at least one heating component/element, to thereby cause induction heating and/or magnetic hysteresis heating of the at least one heating component. In such an arrangement, the or each heating component may be termed a "susceptor". A coil that is configured to generate, in use, a varying magnetic field for penetrating at least one electrically-conductive heating component, to thereby cause induction heating of the at least one electrically-conductive heating component, may be termed an "induction coil" or "inductor coil."

The device may include the heating component(s), for example electrically-conductive heating component(s), and the heating component(s) may be suitably located or locatable relative to the coil(s) to enable such heating of the heating component(s). The heating component(s) may be in a fixed position relative to the coil(s). Alternatively, both the device and an article/consumable may comprise at least one respective heating component, for example at least one electrically-conductive heating component, and the coil(s) may be to cause heating of the heating component(s) of each of the device and the article when the article is in the heating zone.

In some examples, the coil(s) is/are helical. In some examples, the coil(s) encircles at least a part of a heating zone of the device that is configured to receive aerosol generating material. In some examples, the coil(s) is/are helical coil(s) that encircles at least a part of the heating zone. The heating zone may be a receptacle, shaped to receive the aerosol generating material.

In some examples, the device comprises an electrically-conductive heating component that at least partially surrounds the heating zone, and the coil(s) is/are helical coil(s) that encircles at least a part of the electrically-conductive heating component. In some examples, the electrically-conductive heating component is tubular. In some examples, the coil is an inductor coil.

FIG. 1 shows an example of an aerosol provision device 100 for generating aerosol from an aerosol generating medium/material. In broad outline, the device 100 may be used to heat a replaceable article 110 comprising the aerosol generating medium, to generate an aerosol or other inhalable medium which is inhaled by a user of the device 100.

The device 100 comprises a housing 102 (in the form of an outer cover) which surrounds and houses various components of the device 100. The device 100 has an opening 104 in one end, through which the article 110 may be inserted for heating by a heating assembly. In use, the article 110 may be fully or partially inserted into the heating assembly where it may be heated by one or more components of the heater assembly.

The device 100 of this example comprises a first end member 106 which comprises a lid 108 which is moveable relative to the first end member 106 to close the opening 104 when no article 110 is in place. In FIG. 1, the lid 108 is shown in an open configuration, however the cap 108 may move into a closed configuration. For example, a user may cause the lid 108 to slide in the direction of arrow "A".

The device 100 may also include a user-operable control element 112, such as a button or switch, which operates the device 100 when pressed. For example, a user may turn on the device 100 by operating the switch 112.

The device 100 may also comprise an electrical component, such as a socket/port 114, which can receive a cable to charge a battery of the device 100. For example, the socket 114 may be a charging port, such as a USB charging port.

Figure 2:
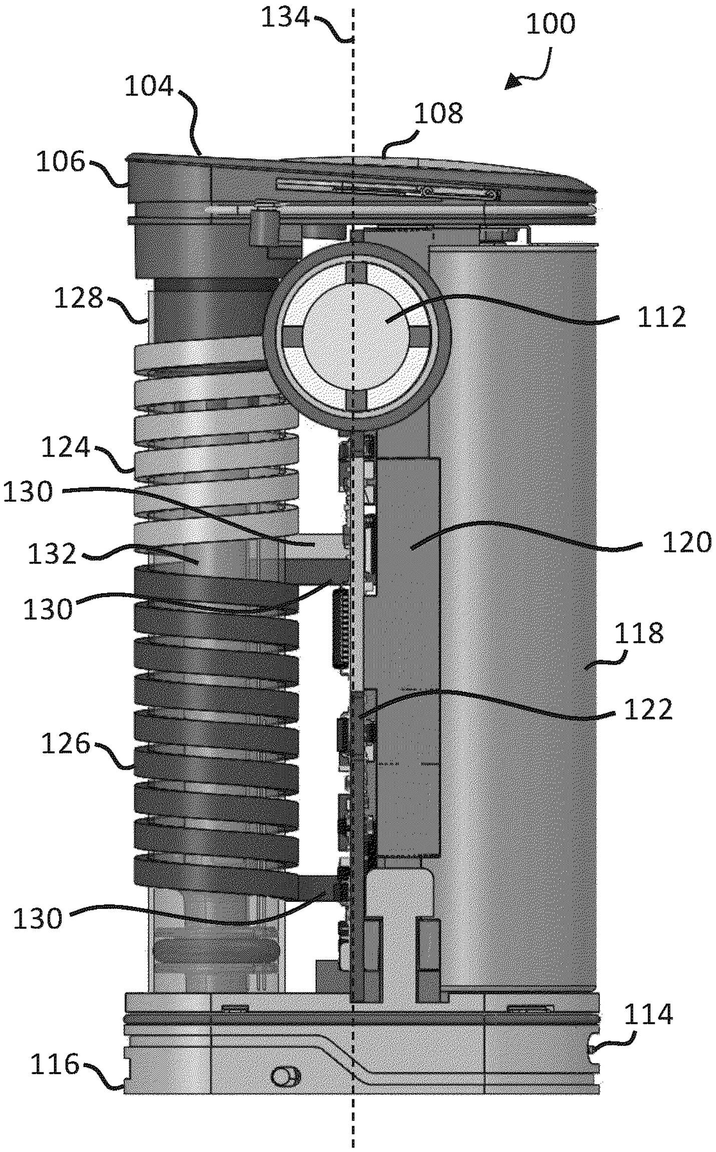
FIG. 2 shows a front view of the aerosol provision device of FIG. 1 with an outer cover removed.

FIG. 2 depicts the device 100 of FIG. 1 with the outer cover 102 removed and without an article 110 present. The device 100 defines a longitudinal axis 134.

As shown in FIG. 2, the first end member 106 is arranged at one end of the device 100 and a second end member 116 is arranged at an opposite end of the device 100. The first and second end members 106, 116 together at least partially define end surfaces of the device 100. For example, the bottom surface of the second end member 116 at least partially defines a bottom surface of the device 100. Edges of the outer cover 102 may also define a portion of the end surfaces. In this example, the lid 108 also defines a portion of a top surface of the device 100.

The end of the device closest to the opening 104 may be known as the proximal end (or mouth end) of the device 100 because, in use, it is closest to the mouth of the user. In use, a user inserts an article 110 into the opening 104, operates the user control 112 to begin heating the aerosol generating material and draws on the aerosol generated in the device. This causes the aerosol to flow through the device 100 along a flow path towards the proximal end of the device 100.

The other end of the device furthest away from the opening 104 may be known as the distal end of the device 100 because, in use, it is the end furthest away from the mouth of the user. As a user draws on the aerosol generated in the device, the aerosol flows away from the distal end of the device 100.

The device 100 further comprises a power source 118. The power source 118 may be, for example, a battery, such as a rechargeable battery or a non-rechargeable battery. Examples of suitable batteries include, for example, a lithium battery (such as a lithium-ion battery), a nickel battery (such as a nickel-cadmium battery), and an alkaline battery. The battery is electrically coupled to the heating assembly to supply electrical power when required and under control of a controller (not shown) to heat the aerosol generating material. In this example, the battery is connected to a central support 120 which holds the battery 118 in place.

The device further comprises at least one electronics module 122. The electronics module 122 may comprise, for example, a printed circuit board (PCB). The PCB 122 may support at least one controller, such as a processor, and memory. The PCB 122 may also comprise one or more electrical tracks to electrically connect together various electronic components of the device 100. For example, the battery terminals may be electrically connected to the PCB 122 so that power can be distributed throughout the device 100. The socket 114 may also be electrically coupled to the battery via the electrical tracks.

In the example device 100, the heating assembly is an inductive heating assembly and comprises various components to heat the aerosol generating material of the article 110 via an inductive heating process. Induction heating is a process of heating an electrically conducting object (such as a susceptor) by electromagnetic induction. An induction heating assembly may comprise an inductive element, for example, one or more inductor coils, and a device for passing a varying electric current, such as an alternating electric current, through the inductive element. The varying electric current in the inductive element produces a varying magnetic field. The varying magnetic field penetrates a susceptor suitably positioned with respect to the inductive element, and generates eddy currents inside the susceptor. The susceptor has electrical resistance to the eddy currents, and hence the flow of the eddy currents against this resistance causes the susceptor to be heated by Joule heating. In cases where the susceptor comprises ferromagnetic material such as iron, nickel or cobalt, heat may also be generated by magnetic hysteresis losses in the susceptor, i.e. by the varying orientation of magnetic dipoles in the magnetic material as a result of their alignment with the varying magnetic field. In inductive heating, as compared to heating by conduction for example, heat is generated inside the susceptor, allowing for rapid heating. Further, there need not be any physical contact between the inductive heater and the susceptor, allowing for enhanced freedom in construction and application.

The induction heating assembly of the example device 100 comprises a susceptor arrangement 132 (herein referred to as "a susceptor"), a first inductor coil 124 and a second inductor coil 126. The first and second inductor coils 124, 126 are made from an electrically conducting material. In this example, the first and second inductor coils 124, 126 are made from Litz wire/cable which is wound in a helical fashion to provide helical inductor coils 124, 126. Litz wire comprises a plurality of individual wires which are individually insulated and are twisted together to form a single wire. Litz wires are designed to reduce the skin effect losses in a conductor. In the example device 100, the first and second inductor coils 124, 126 are made from copper Litz wire which has a rectangular cross section. In other examples the Litz wire can have other shape cross sections, such as circular.

The first inductor coil 124 is configured to generate a first varying magnetic field for heating a first section of the susceptor 132 and the second inductor coil 126 is configured to generate a second varying magnetic field for heating a second section of the susceptor 132. In this example, the first inductor coil 124 is adjacent to the second inductor coil 126 in a direction along the longitudinal axis 134 of the device 100 (that is, the first and second inductor coils 124, 126 to not overlap). The susceptor arrangement 132 may comprise a single susceptor, or two or more separate susceptors. Ends 130 of the first and second inductor coils 124, 126 can be connected to the PCB 122.

It will be appreciated that the first and second inductor coils 124, 126, in some examples, may have at least one characteristic different from each other. For example, the first inductor coil 124 may have at least one characteristic different from the second inductor coil 126. More specifically, in one example, the first inductor coil 124 may have a different value of inductance than the second inductor coil 126. In FIG. 2, the first and second inductor coils 124, 126 are of different lengths such that the first inductor coil 124 is wound over a smaller section of the susceptor 132 than the second inductor coil 126. Thus, the first inductor coil 124 may comprise a different number of turns than the second inductor coil 126 (assuming that the spacing between individual turns is substantially the same). In yet another example, the first inductor coil 124 may be made from a different material to the second inductor coil 126. In some examples, the first and second inductor coils 124, 126 may be substantially identical.

In this example, the first inductor coil 124 and the second inductor coil 126 are wound in opposite directions. This can be useful when the inductor coils are active at different times. For example, initially, the first inductor coil 124 may be operating to heat a first section of the article 110, and at a later time, the second inductor coil 126 may be operating to heat a second section of the article 110. Winding the coils in opposite directions helps reduce the current induced in the inactive coil when used in conjunction with a particular type of control circuit. In FIG. 2, the first inductor coil 124 is a right-hand helix and the second inductor coil 126 is a left-hand helix. However, in another embodiment, the inductor coils 124, 126 may be wound in the same direction, or the first inductor coil 124 may be a left-hand helix and the second inductor coil 126 may be a right-hand helix.

The susceptor 132 of this example is hollow and therefore defines a receptacle within which aerosol generating material is received. For example, the article 110 can be inserted into the susceptor 132. In this example the susceptor 120 is tubular, with a circular cross section.

The device 100 of FIG. 2 further comprises an insulating member 128 which may be generally tubular and at least partially surround the susceptor 132. The insulating member 128 may be constructed from any insulating material, such as plastic for example. In this particular example, the insulating member is constructed from polyether ether ketone (PEEK). The insulating member 128 may help insulate the various components of the device 100 from the heat generated in the susceptor 132.

The insulating member 128 can also fully or partially support the first and second inductor coils 124, 126. For example, as shown in FIG. 2, the first and second inductor coils 124, 126 are positioned around the insulating member 128 and are in contact with a radially outward surface of the insulating member 128. In some examples the insulating member 128 does not abut the first and second inductor coils 124, 126. For example, a small gap may be present between the outer surface of the insulating member 128 and the inner surface of the first and second inductor coils 124, 126.

In a specific example, the susceptor 132, the insulating member 128, and the first and second inductor coils 124, 126 are coaxial around a central longitudinal axis of the susceptor 132.

Figure 3:
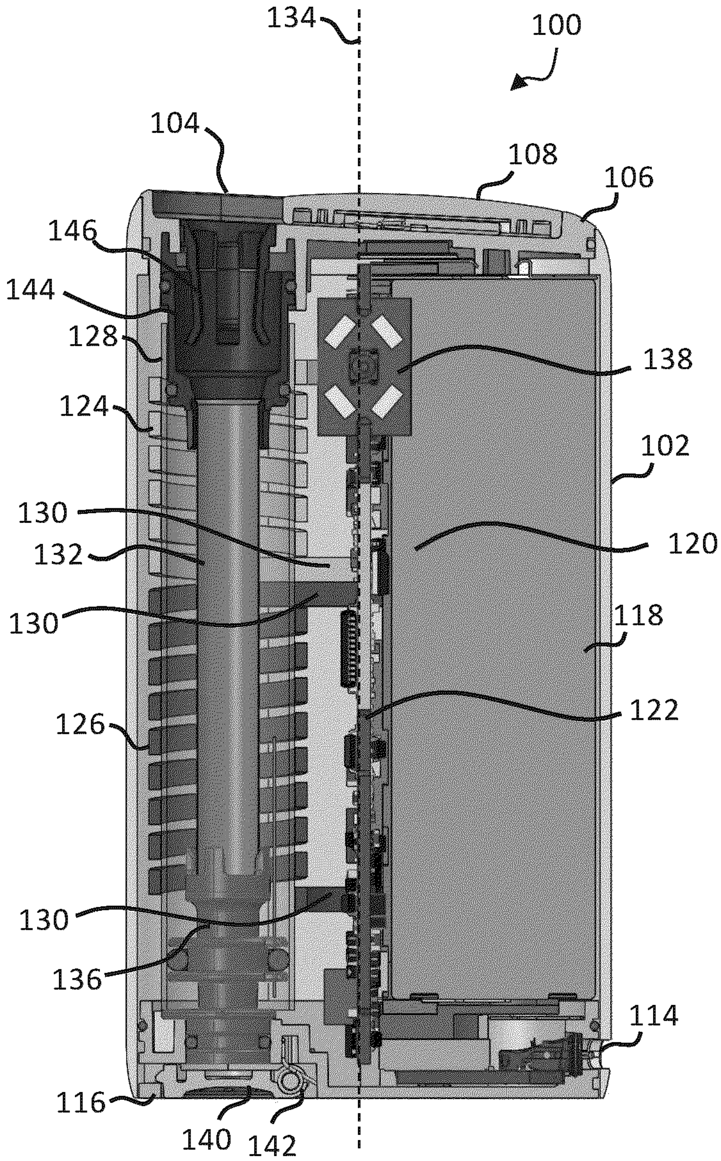
FIG. 3 shows a cross-sectional view of the aerosol provision device of FIG. 1.

FIG. 3 shows a side view of device 100 in partial cross-section. The outer cover 102 is present in this example. The rectangular cross-sectional shape of the first and second inductor coils 124, 126 is more clearly visible.

The device 100 further comprises a support 136 which engages one end of the susceptor 132 to hold the susceptor 132 in place. The support 136 is connected to the second end member 116.

The device may also comprise a second printed circuit board 138 associated within the control element 112.

The device 100 further comprises a second lid/cap 140 and a spring 142, arranged towards the distal end of the device 100. The spring 142 allows the second lid 140 to be opened, to provide access to the susceptor 132. A user may open the second lid 140 to clean the susceptor 132 and/or the support 136.

The device 100 further comprises an expansion chamber 144 which extends away from a proximal end of the susceptor 132 towards the opening 104 of the device. Located at least partially within the expansion chamber 144 is a retention clip 146 to abut and hold the article 110 when received within the device 100. The expansion chamber 144 is connected to the end member 106.

Figure 4:
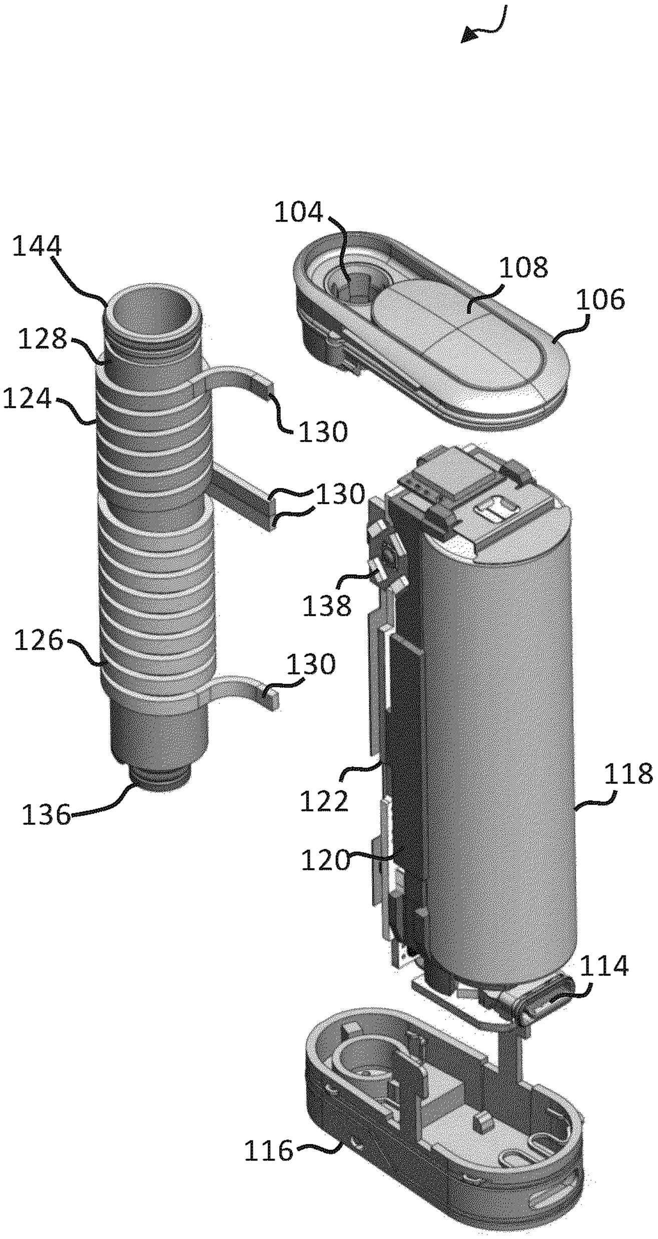
FIG. 4 shows an exploded view of the aerosol provision device of FIG. 2.

FIG. 4 is an exploded view of the device 100 of FIG. 1, with the outer cover 102 omitted.

Figure 5A:
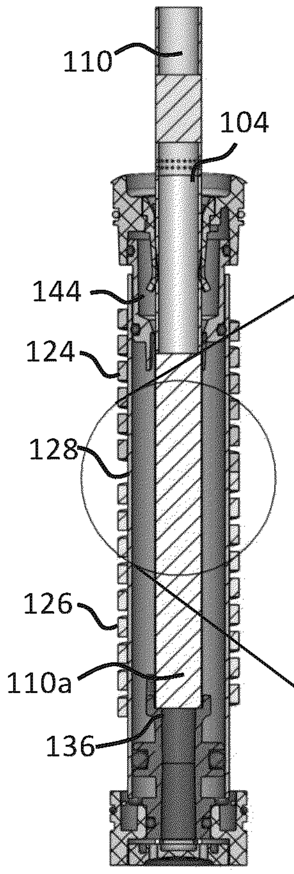
FIG. 5A shows a cross-sectional view of a heating assembly within an aerosol provision device.
Figure 5B:
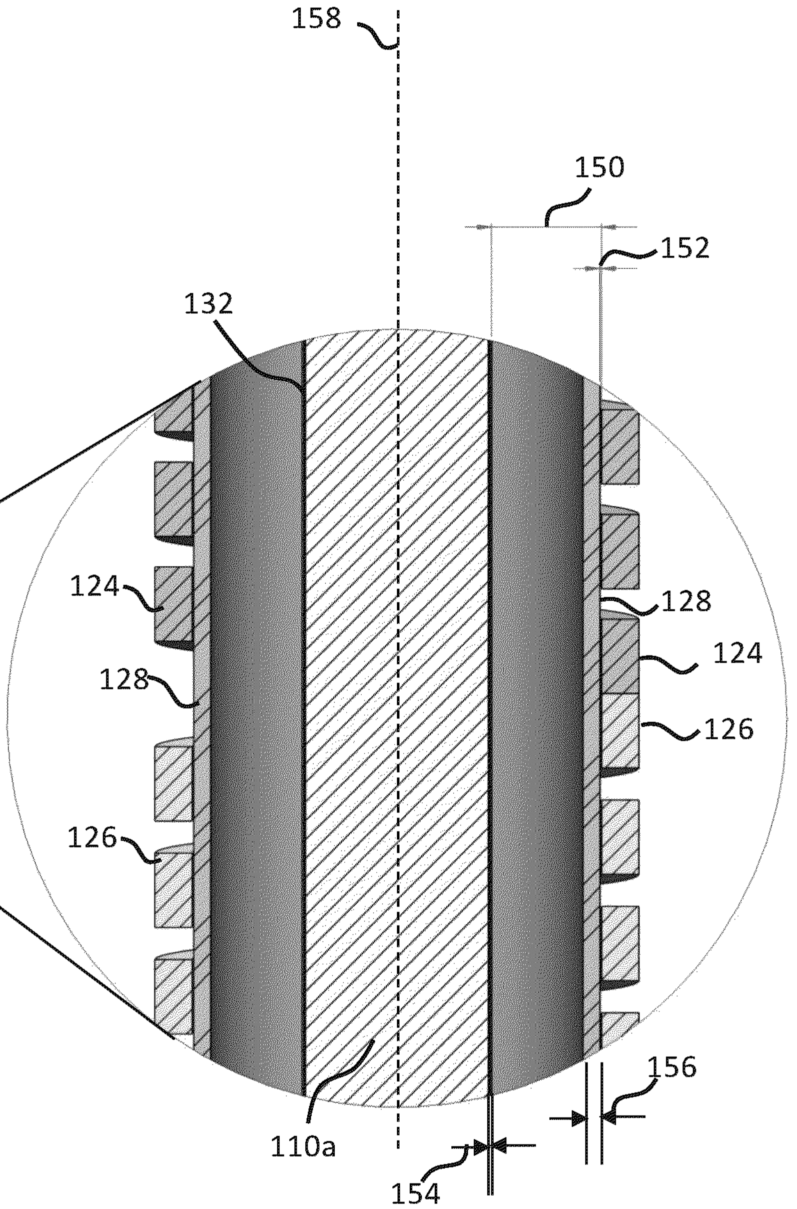
FIG. 5B shows a close-up view of a portion of the heating assembly of FIG. 5A.

FIG. 5A depicts a cross section of a portion of the device 100 of FIG. 1. FIG. 5B depicts a close-up of a region of FIG. 5A. FIGS. 5A and 5B show the article 110 received within the susceptor 132, where the article 110 is dimensioned so that the outer surface of the article 110 abuts the inner surface of the susceptor 132. This ensures that the heating is most efficient. The article 110 of this example comprises aerosol generating material 110*a*. The aerosol generating material 110*a* is positioned within the susceptor 132. The article 110 may also comprise other components such as a filter, wrapping materials and/or a cooling structure.

FIG. 5B shows a longitudinal axis 158 of the hollow, tubular susceptor 132. The inner and outer surfaces of the susceptor 132 extend around the axis 158 in an azimuthal direction. Surrounding the susceptor 132 may be the hollow, tubular insulating member 128. An inner surface of the insulating member 128 is positioned away from the outer surface of the susceptor 132 to provide an air gap between the insulating member 128 and the susceptor 132. The air gap provides insulation from the heat generated in the susceptor 132. Surrounding the insulating member 128 are the inductor coils 124, 126. It will be appreciated that in some examples just one inductor coil may surround the insulating member 128. The inductor coils 124, 126 are helically wrapped around the insulating member, and extend along the axis 158.

FIG. 5B shows that the outer surface of the susceptor 132 is spaced apart from the inner surface of the inductor coils 124, 126 by a distance 150, measured in a direction perpendicular to the longitudinal axis 158 of the susceptor 132. In one particular example, the distance 150 is about 3 mm to 4 mm, about 3-3.5 mm, or about 3.25 mm. The outer surface of the susceptor 132 is the surface that is furthest away from the axis 158. The inner surface of the susceptor 132 is the surface that is closest to the axis 158. The inner surface of the inductor coils 124, 126 is the surface that is closest to the axis 158. The outer surface of the insulating member 128 is the surface that is furthest away from the axis 158.

To achieve the relative spacing 150 between the susceptor 132 and the inductor coils 124, 126, the susceptor 132 can be held in place by one or more components of the device 100. In the example of FIG. 5A, the susceptor 132 is held in place at one end by a first support 136, and at the other end by a second support 144 (which may also function as an expansion chamber). The insulating member 128 may also be held in place by the first and second supports 136, 144.

FIG. 5B further shows that the outer surface of the insulating member 128 is spaced apart from the inner surface of the inductor coils 124, 126 by a distance 152, measured in a direction perpendicular to a longitudinal axis 158 of the susceptor 132. In one particular example, the distance 152 is about 0.05 mm. In another example, the distance 152 is substantially 0 mm, such that the inductor coils 124, 126 abut and touch the insulating member 128.

In one example, the susceptor 132 has a wall thickness 154 of about 0.025 mm to 1 mm. In this example, the susceptor 132 has a thickness 154 of about 0.05 mm. The thickness of the susceptor 132 is the average distance between the inner surface of the susceptor 132 and the outer surface of the susceptor 132, measured in a direction perpendicular to the axis 158.

In one example, the susceptor 132 has a length of about 40 mm to 60 mm, about 40 mm to 50 mm, about 40 mm to 45 mm, or about 44.5 mm. In this particular example, the susceptor 132 has a length of about 44.5 mm and can receive an article 110 comprising aerosol generating material, where the aerosol generating material 110*a* has a length of about 42 mm. The length of the aerosol generating material and susceptor 132 is measured in a direction parallel to the axis 158.

In an example, the insulating member 128 has a thickness 156 of between about 0.25 mm and about 2 mm, or between about 0.25 mm and about 1 mm. In this particular example, the insulating member has a thickness 156 of about 0.5 mm. The thickness 156 of the insulating member 128 is the average distance between the inner surface of the insulating member 128 and the outer surface of the insulating member 128, measured in a direction perpendicular to the axis 158.

Figure 6:
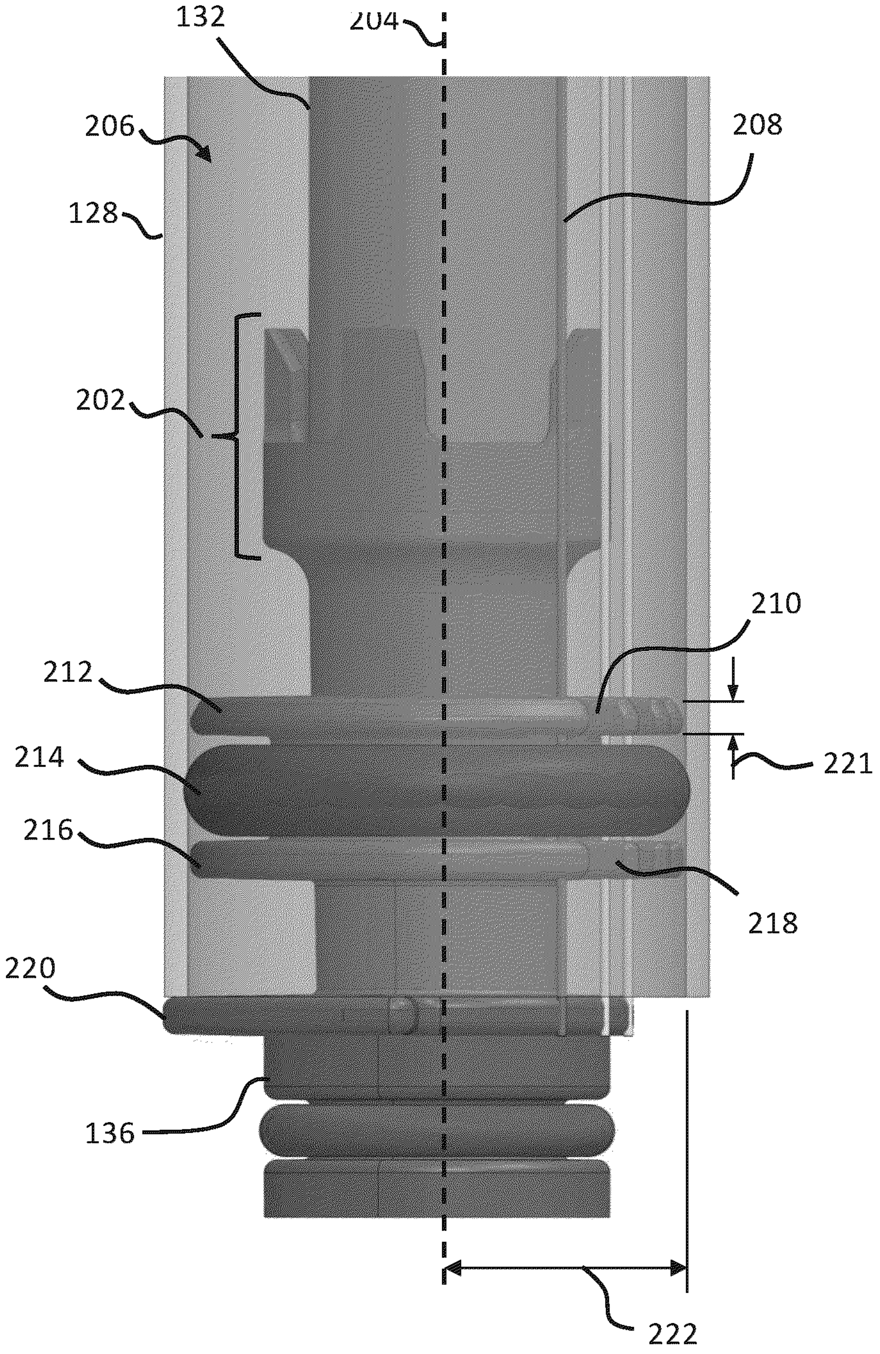
FIG. 6 shows a close-up view of the support in the aerosol provision device of FIG. 3.

FIG. 6 depicts a close up of the support 136, which was briefly described above in relation to FIG. 3. The support 136 defines an axis 204 which is arranged parallel to the longitudinal axis 134 of the device 100. The axis 204 may be the longitudinal axis of the support 136, for example.

The support 136 comprises an engagement region 202 at one end, which receives and engages a distal end of the susceptor 132. The distal end of the susceptor 132 is the end of the susceptor 132 that is arranged furthest away from a user's mouth when the device 100 is in use. In other examples, the support 136 may arranged to engage the other end of the susceptor 132. In this example the susceptor 132 and engagement region 202 form an interference fit, however other attachment means may be used. The support 136 holds the susceptor parallel to the axis 204 at a predetermined distance from the one or more inductor coils 124, 126 which surround the susceptor (most clearly seen in FIG. 2).

As mentioned above, the device 100 comprises a hollow insulating member 128 which surrounds the susceptor 132 and at least a portion of the support 136. An inner surface of the insulating member 128 is arranged at a predetermined distance from the axis 204. A space 206 (such as an air gap) is provided between the outer surface of the susceptor 132 and the inner surface of the insulating member 128. The air gap 206, and insulating member 128 act to insulate components of the device 100 from the heat generated in the susceptor 132.

The device 100 may comprise one or more temperature sensors, which can be used to measure the temperature of the susceptor 132. A temperature sensor may be affixed to the outer surface of the susceptor 132, or may be arranged in proximity to the susceptor 132. Each sensor may comprise one or more wires connected to the temperature sensor. FIG. 6 depicts a first wire 208 connected to a first temperature sensor (not visible in FIG. 6). The wire 208 connects the temperature sensor to other components within the device, such as the PCB 122. A controller, arranged on the PCB 122, for example, can determine the temperature of the susceptor 132 based on signals received from the temperature sensor (s). The device 100 can be configured to control the one or more induction coils 124, 126 based on the detected temperature. For example, an inductor coil may be turned off when the temperature of the susceptor 132 has reached a predetermined threshold.

As shown in FIG. 6, the wire 208 is arranged parallel to the axis 204. However, in some examples the wire 208 may not be parallel to the axis 204. For example, the wire may wind or bend as it passes through the space 206.

To connect the temperature sensor to other components within the device 100, the support 136 defines a channel 210 through which the wire 208 is routed. The presence of the channel 210 means that the wire 208 does not need to pass through a surface of the insulating member 128.

In this example, the channel 210 is formed in a first portion 212 of the support 136. Thus, the channel 210 extends through the first portion 212. In this example, the first portion is generally disk-shaped, and so has a cross section that is generally circular in shape (most clearly seen in FIG. 8). The first portion 212 is arranged substantially perpendicular to the axis 204. The first portion 212 has a thickness/depth 221, measured in a direction parallel to the axis 204. The channel 210 extends through the first portion 212 in a direction substantially parallel to the axis 204, and the channel 210 therefore has a length equal to the depth 221 of the first portion 212.

The first portion 212 has an outer perimeter, which may abut the inner surface of the insulating member 128 to help seal the space 206 between the susceptor 132 and the insulating member 128. In some examples, a gap may be present between the outer perimeter of the first portion 212 and the inner surface of the insulating member 128. The insulating member 128 surrounds the first portion 212 and the inner surface of the insulating member 128 is positioned at a predetermined radial distance 222 away from the outer surface of the susceptor 132.

In this example, the support 136 further comprises a second portion 216, which is spaced apart from the first portion 212 along the axis 204. In other examples the second portion may be omitted. The second portion 216 may be similar to the first portion 212. For example, the first and second portions 212, 216 may have a similar cross-sectional shape and/or size, and/or a similar depth. In this example, the second portion 216 comprises a second channel 218, through which the wire 208 is routed.

The support 136 further comprises a resilient member 214, such as an O-ring, which is spaced from the channel 210 along the axis 204. In this example, where the support 136 comprises a second portion 216, the resilient member 214 is arranged between first and second portions 212, 216. The resilient member 214 is therefore held in place by the first and second portions 212, 216. The wire 208 passes underneath the resilient member 214, and is held against a surface of the support 136. The resilient member 214 therefore holds the wire 208 within the channels 210, 218, and helps keep the wire 208 taught. The resilient member 214 may abut the inner surface of the insulating member 128 to help seal the space 206 between the susceptor 132 and the insulating member 128.

In some examples, the second portion may not comprise a channel, and may have a cross sectional area which is smaller than that of the first portion. The wire may therefore be routed around the second portion rather than through a channel formed in the second portion. The second portion in such an example may serve to hold the resilient member in place.

In some examples, the support 136 further comprises an end portion 220 which abuts the distal end of the insulating member 128. The end portion 220 supports and holds the insulating member 128 in place, while also helping further seal the space 206 between the susceptor 132 and the insulating member 128. In other examples, the insulating member 128 may be supported by other means.

The end portion 220 is arranged adjacent to the end insulating member 128, and is wider than the insulating member 128. This means that the insulating member 128 does not surround the end portion 220 because the end portion 220 has a cross section which is greater than that of the insulating member 128.

In some examples, the support 136 is hollow. Debris and/or liquid from the heated aerosol generating material may pass from the susceptor 132 and into the hollow cavity of the support 136. As mentioned in relation to FIG. 3, the device 100 may comprise a second lid 140 which can be opened to allow a user to clean the susceptor 132 and/or the support 136.

Figure 7:
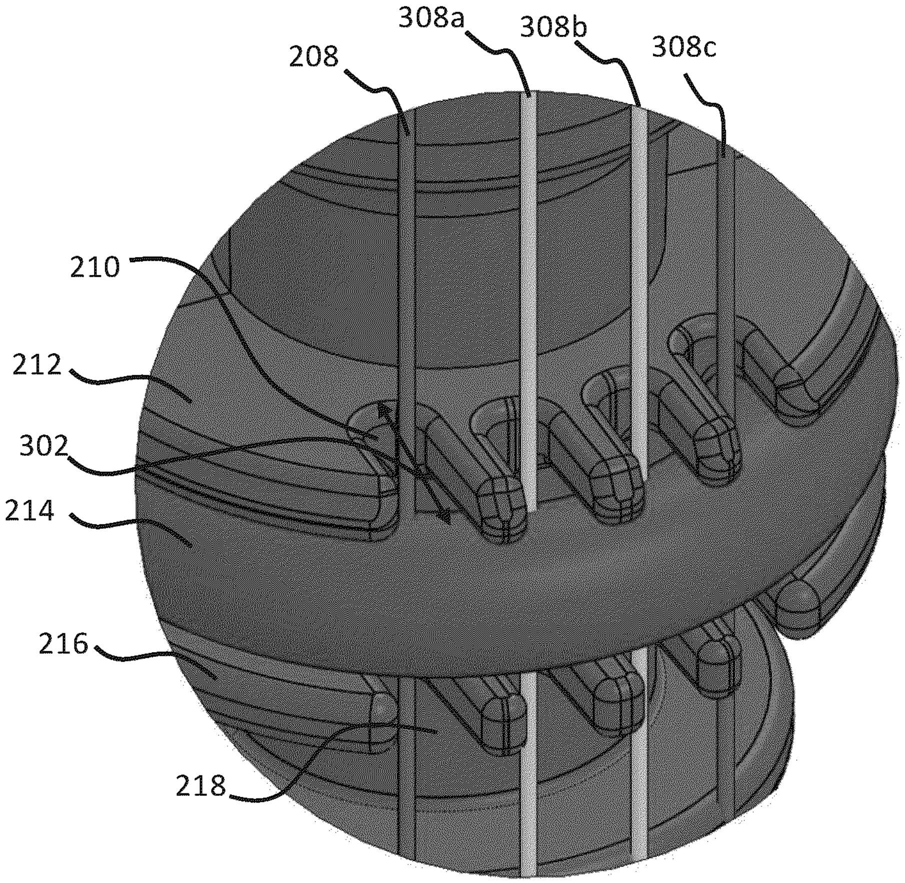
FIG. 7 shows a close-up perspective view of channels formed in the support of FIG. 6.

FIG. 7 shows a perspective view of the support 136 in the vicinity of the channel 210. As shown, the channel 210 is formed through the first portion 212, and the wire 208 passes through the channel 210. The channel 210 has a depth 302*a* measured in a direction perpendicular to the axis 204. The channels also have a width 302*b* measured in a direction perpendicular to the depth 302*a*. In this example, the depth 302*a* is about 1.3 mm and the width 302*b* is about 0.9 mm. The wire 208 is also surrounded by the resilient member 214, and passes through a second channel 218 formed in the second portion 216.

In the example of FIGS. 6 and 7, the first portion 212 and the second portion 216 each comprise four channels, through which four wires 208, 308*a*, 308*b*, 308*c* are routed. The first wire 208 and the second wire 308*a* may be connected to a first temperature sensor, and the third wire 308*b* and the fourth wire 308*c* may be connected to a second temperature sensor, for example.

Figure 8:
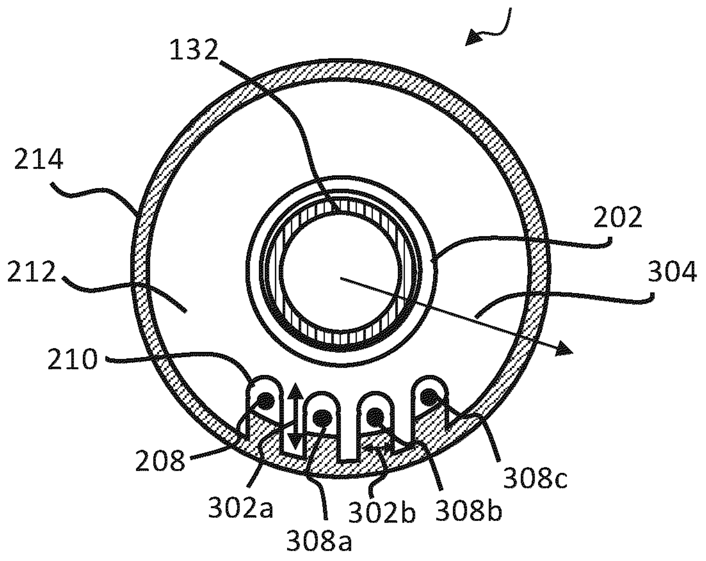
FIG. 8 shows a diagrammatic representation of the support of FIGS. 6 and 7 in a top-down view.

FIG. 8 shows diagrammatic representation of the support 136 of FIGS. 6 and 7 in a top-down view. The hollow, cylindrical susceptor 132 is shown engaged with the engagement region 202 of the support 136. In this example the outer perimeter of the resilient member 214 extends further away from the axis 204 than the outer perimeter of the first portion 212, measured in a radial direction 304. The resilient member 214 can therefore abut the inner surface of the insulating member, when present.

Figure 9:
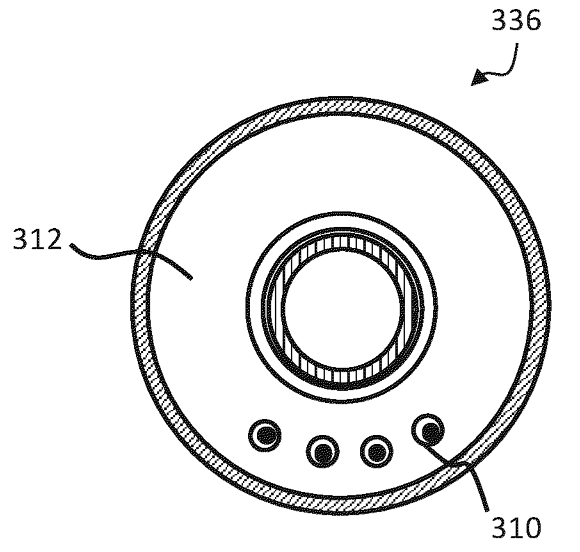
FIG. 9 shows a diagrammatic representation of another example support.

As shown in FIG. 8, the channel 210 is open along its length (where the length is measured along the axis 204, and into the page). The channel 210 therefore forms a notch at the outer perimeter of the first portion 212. Each of the three other channels have the same form. In contrast, FIG. 9 depicts another support 336, in which the channels 310 are closed along their length, and therefore form through holes in the first portion 312. The support 336 of FIG. 9 may be used in the device 100, and may have any or all of the features of support 136.

Figure 10:
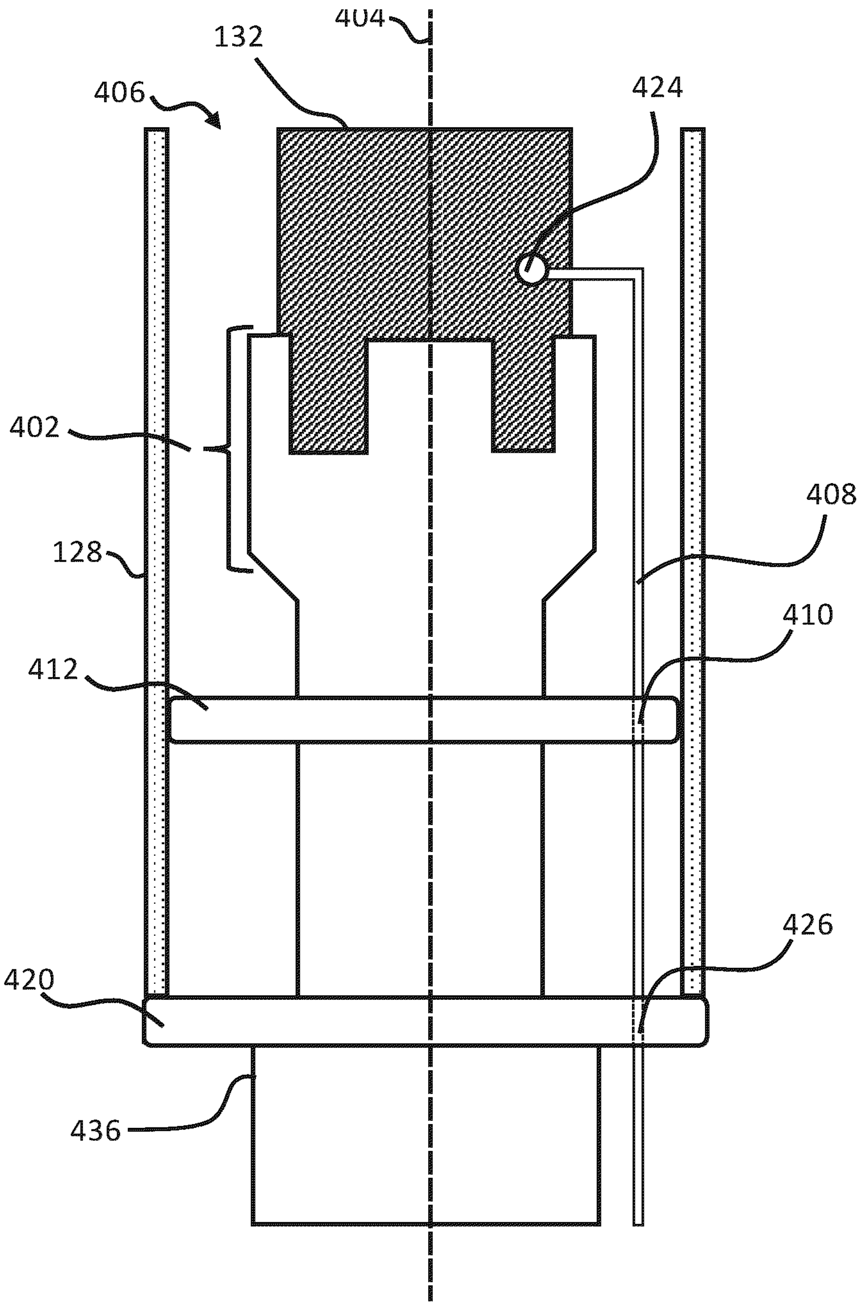
FIG. 10 shows a diagrammatic representation of a further support.

FIG. 10 depicts another support 436 according to an example. The support 436 may be used in the device 100. The support 436 in this example differs from the support in FIGS. 6 and 7 in that it does not comprise a second portion or a resilient member. Although the channel 410 is provided by a through hole, the channel 410 could instead be a channel that is open along its length.

The support 436 of FIG. 10 comprises an engagement region 402 which receives and engages a distal end of the susceptor 132. The support 436 defines an axis 404 which may be arranged parallel to the longitudinal axis 134 of the device 100. The axis 404 may be the longitudinal axis of the support 436, for example. The support 436 holds the susceptor parallel to the axis 404.

The device 100 comprises a hollow insulating member 128 which surrounds the susceptor 132. A space 406 (such as an air gap) is provided between the outer surface of the susceptor 132 and the inner surface of the insulating member 128.

The device 100 comprises temperature sensor 424 which is affixed to an outer surface of the susceptor 132. A wire 408 is connected to the temperature sensor 424. One or more other wires (not shown) may also be connected to the temperature sensor 424. There may also be a second temperature sensor present within the device 100.

The support 436 defines a channel 410, in the form of a through hole, through which the wire 408 is routed. In this example, the channel 410 is formed through a first portion 412 of the support 436. The first portion 412 has a depth, measured in a direction parallel to the axis 404, and the channel 410 extends through the first portion 412 in a direction substantially parallel to the axis 404. The through hole therefore has a length equal to the depth of the first portion 412. As shown, the first portion 412 has an outer perimeter, which abuts the inner surface of the insulating member 128.

The support 436 further comprises an end portion 420 which abuts the distal end of the insulating member 128. The end portion 420 supports and holds the insulating member 128 in place, while also helping further seal the space 406 between the susceptor 132 and the insulating member 128. In this example, the end portion 420 also defines a channel 426, in the form of a through hole, through which the wire 408 is routed. This allows the wire 408 to be connected to other components of the device 100.

In the examples of FIGS. 6-10 the first portion, the second portion, the susceptor and the insulating member each have a substantially circular shape cross section. In other examples, the cross sections of any or all of these components may take any other shape, such as square, rectangular or elliptical.

Figure 11:
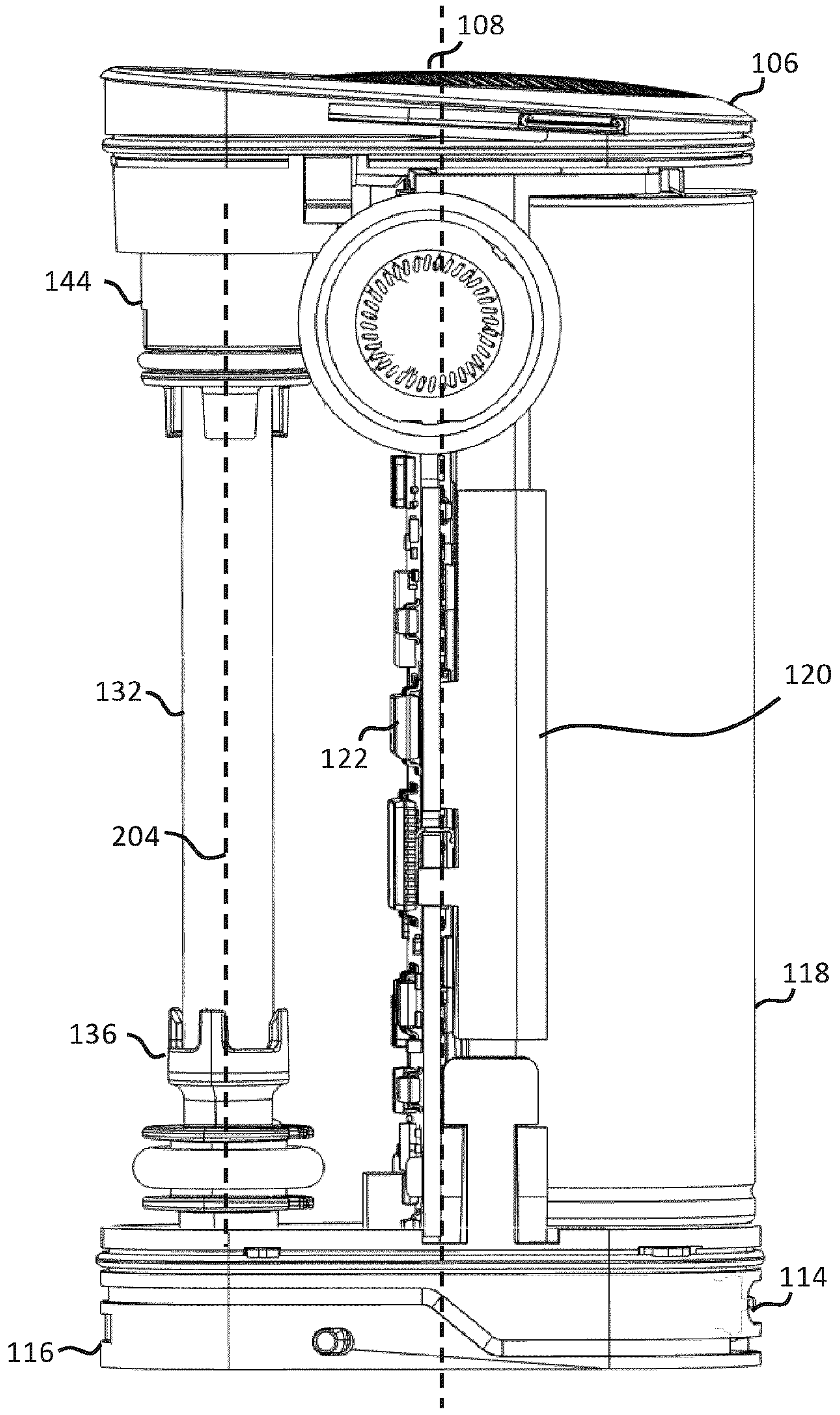
FIG. 11 shows a susceptor arranged within an aerosol provision device.

FIG. 11 depicts part of the device 100. The inductor coils 124, 126 and insulating member 128 have been omitted for clarity. In this example, the first support 136 defines an axis 204 which is arranged parallel to the longitudinal axis 158 of the susceptor 132, and it may also be arranged parallel to the longitudinal axis 134 of the device 100. The axis 204 may be the longitudinal axis of the support 136, for example.

Figure 12:
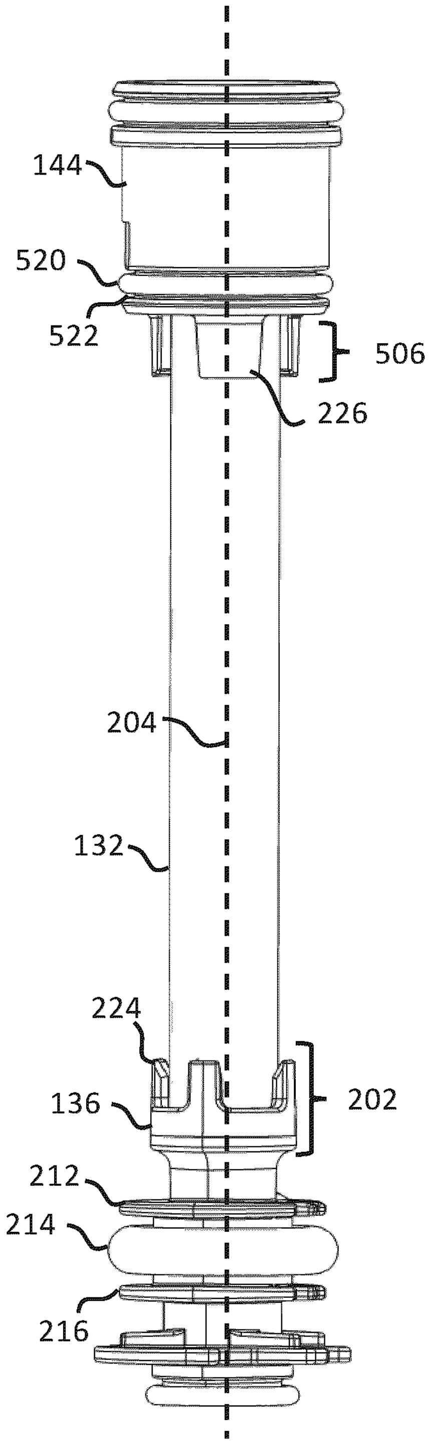
FIG. 12 shows the susceptor engaged by first and second supports.

FIG. 12 shows a close up of the first support 136, the second support 144 and the susceptor 132. The first support 136 comprises a first engagement region 202 at one end, which receives and engages a distal end of the susceptor 132. The distal end of the susceptor 132 is the end of the susceptor 132 that is arranged furthest away from a user's mouth when the device 100 is in use. In this example the susceptor 132 and the first engagement region 202 form an interference fit or a friction fit, however other attachment means may be used.

The first engagement region 202 may comprise two or more protrusions 224 or prongs which extend from an end of the first support 136 along the susceptor 132 in the direction of the axis 204. Each of the protrusions 224 are spaced around the outer surface of the susceptor 132 and are separated by a gap. These protrusions 224 flex outwards as the susceptor 132 is inserted into the first engagement region 202.

Similarly, the second support 144 comprises a second engagement region 506 at one end, which receives and engages a proximal end of the susceptor 132. The proximal end of the susceptor 132 is the end of the susceptor 132 that is arranged closest to a user's mouth when the device 100 is in use. In this example the susceptor 132 and second engagement region 506 form an interference fit or friction fit, however other attachment means may be used.

The second engagement region 506 may also comprise two or more protrusions 226 or prongs which extend from an end of the second support 144 along the susceptor 132 in the direction of the axis 204. Each of the protrusions 226 are spaced around the outer surface of the susceptor 132 and are separated by a gap. The protrusions 226 allow the second support 144 to flex as the susceptor 132 is inserted into the engagement region 506.

Together, the first and second supports 136, 144 hold the susceptor 132 parallel to the axis 204 at a predetermined distance 150 from the one or more inductor coils 124, 126 which surround the susceptor (most clearly seen in FIGS. 5A and 5B).

The first and second supports 134, 144 may be made from the same, or different material. In this example, the first and second supports 134, 144 are both made from a plastics material, such as PEEK which a thermal conductivity of about 0.32 W/mK and a melting point of about 343° C. With a low thermal conductivity, the rate at which heat flows from the susceptor 132 through the first and second supports 134, 144 is reduced. Other materials with low thermal conductivities may be used instead. Preferably the first and second supports 134, 144 are made from plastics materials because these can be lightweight.

In some examples the susceptor 132 is heated by the first and second inductor coils 124, 126 to a temperature of between about 240° C. and about 280° C. With the first and second supports 134, 144 having a melting point which is greater than the temperature of the heated susceptor 132 by at least 60° C., the first and second supports 134, 144 are less likely to soften and weaken due to the heat.

Figure 13:
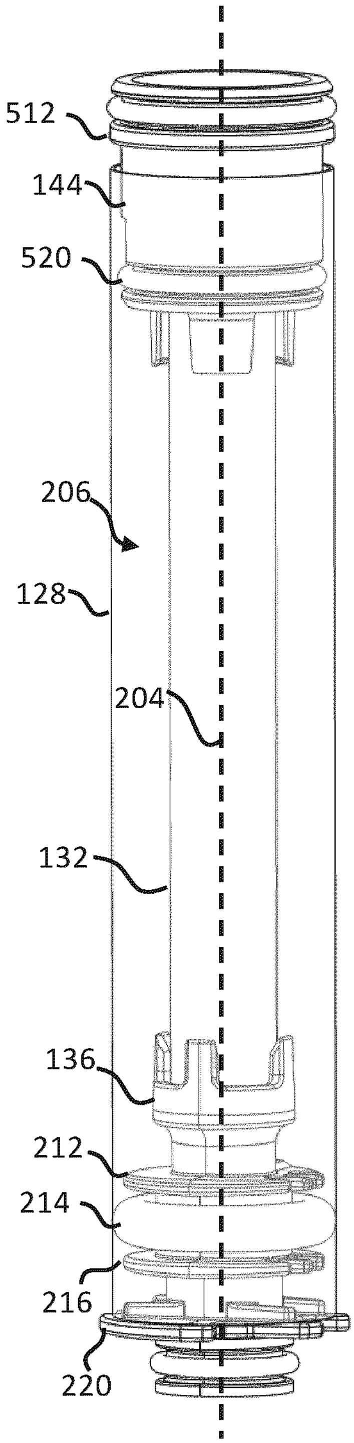
FIG. 13 shows the susceptor surrounded by an insulating member.

FIG. 13 shows the arrangement of FIG. 12 with an insulating member 128 surrounding the susceptor 132. The insulating member 128 is depicted as being transparent so that the susceptor 132 is visible within the hollow insulating member 128. The insulating member 128 may or may not be transparent.

The insulating member 128 is positioned away from the susceptor 132 to provide an air gap 206 between the outer surface of the susceptor 132 and the inner surface of the insulating member 128. The air gap 206 provides insulation.

The insulating member 128 may be held in place by one or more components of the device 100. In the present example, however, the insulating member 128 abuts the first support 136 towards one end of the insulating member. For example, the first support 136 may comprise an end portion 220 which has a cross section that is larger than a cross section of the insulating member 128. A first end of the insulating member 128 therefore abuts the end portion 220 of the first support 136. By abutting at least one of the first and second supports 136, 144 the insulating member 128 can be held substantially parallel to the axis 204.

In some examples the insulating member 128 also abuts the second support 144 towards an end of the insulating member 128. For example, the second support 144 may also comprise an end portion 512 which has a cross section that is larger than a cross section of the insulating member 128. A second end of the insulating member 128 may therefore abut the end portion 512 of the second support 144. FIG. 13 shows a small gap between the end portion 512 of the second support 144 and the second end of the insulating member 128. The small gap can allow for manufacturing tolerances and may not be present in certain examples.

FIGS. 12 and 13 show the first support 136 with a first resilient member 214 extending around a portion of the support 136. In this example the first resilient member 214 is an O-ring. FIG. 13 shows that the first resilient member 214 is dimensioned such that it abuts an inner surface of the insulating member 128 when the insulating member 128 is in place. The first resilient member 214 can therefore help seal the space 208 between the susceptor 132 and insulating member 128 to better insulate the device 100. The first resilient member 214 may be compressed when the insulating member 128 surrounds the susceptor 132.

In some examples, the first support 132 comprises a first portion 212 and a second portion 216, where the first resilient member 214 is arranged between the first and second portions 212, 216. The first and second portions 212, 216 stop the first resilient member 214 from sliding along the first support 136, which could reduce the sealing effect.

FIGS. 12 and 13 also show the second support 144 with a second resilient member 520 extending around a portion of the support 144. In this example the second resilient member 520 is an O-ring. In some examples the second resilient member 520 is dimensioned such that it abuts an inner surface of the insulating member 128 when the insulating member 128 is in place. When both the first and second resilient members 214, 520 abut the insulating member 128, the device 100 may be better insulated when compared to an arrangement in which one, or none of the resilient members 214, 520 abut the insulating member 128.

In some examples, the second support 144 comprises a recess 522 within which the second resilient member is located. In some examples, the second resilient member 520 has a width that is smaller than a width of the first resilient member 214. The widths of the resilient members are measured in a direction perpendicular to the axis 204.

In the present example, the first and second resilient members 214, 520 are made from a material which has a thermal conductivity of less than about 0.5 W/mK, such as less than about 0.25 W/mK. The first and second resilient members 214, 520 may be made from silicone rubber, for example.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A support for a heater component of an aerosol provision device, wherein the support defines an axis and is configured to engage an end of the heater component to hold the heater component substantially parallel to the axis at a predetermined distance from a coil, and wherein the support defines a channel to receive a wire of a temperature sensor, the channel defining an opening into a space between the heater component and the coil, wherein the channel is open along its length.

2. The support according to claim 1, wherein:

the support comprises a first portion and the channel is formed through the first portion, and wherein the channel is a notch at an outer perimeter of the first portion.

3. The support according to claim 2, wherein:

the support comprises a second portion spaced apart from the first portion in a direction parallel to the axis; and a second channel is formed through the second portion to receive the wire.

4. The support according to claim 3, further comprising a resilient member arranged between the first and second portions.

5. The support according to claim 4, wherein the wire passes through an aperture defined within the resilient member.

6. The support according to claim 1, further comprising an end portion configured to abut an end of an insulating member which surrounds the heater component.

7. An aerosol provision device, comprising:
the support according to claim 1;
a heater component engaged with the support at one end;
a coil extending around the heater component, wherein the coil is configured to heat the heater component;
a temperature sensor for sensing the temperature of the heater component, wherein the temperature sensor is positioned in a space between the coil and the heater component; and
a wire positioned in the channel of the support and connected to the temperature sensor.

8. The aerosol provision device according to claim 7, further comprising an insulating member, wherein:
the support comprises a first portion, and the channel is formed through the first portion;
the insulating member surrounds the heater component and abuts at least part of the first portion of the support, thereby to position the insulating member at a predetermined radial distance outward from the heater component.

9. The aerosol provision device according to claim 7, further comprising:
a second temperature sensor for sensing the temperature of the heater component, wherein the second temperature sensor is positioned in the space between the coil and the heater component; and
a second wire connected to the second temperature sensor;
wherein the support defines a second channel to receive the second wire.

10. An aerosol provision device, comprising:
a support defining an axis;
a coil;
a heater component, wherein:
the heater component is heatable by the coil;
an end of the heater component is engaged with the support to hold the heater component substantially parallel to the axis at a predetermined distance from the coil; and
the support defines a channel which defines an opening into a space between the heater component and the coil, wherein the channel is open along its length;
a temperature sensor for sensing the temperature of the heater component, wherein the temperature sensor is positioned in the space between the heater component and the coil; and
a wire positioned in the channel of the support and connected to the temperature sensor.

11. An aerosol provision system, comprising:
the aerosol provision device according to claim 10; and
an article comprising aerosol generating material.

* * * * *